(12) United States Patent
Itasaka

(10) Patent No.: US 12,483,102 B2
(45) Date of Patent: Nov. 25, 2025

(54) ROTOR STRUCTURE

(71) Applicant: Mazda Motor Corporation, Hiroshima (JP)

(72) Inventor: Naoki Itasaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 204 days.

(21) Appl. No.: 18/407,748

(22) Filed: Jan. 9, 2024

(65) Prior Publication Data

US 2024/0258892 A1 Aug. 1, 2024

(30) Foreign Application Priority Data

Jan. 31, 2023 (JP) .................................. 2023-012975

(51) Int. Cl.
*H02K 21/02* (2006.01)

(52) U.S. Cl.
CPC .................................. *H02K 21/029* (2013.01)

(58) Field of Classification Search
CPC .......... H02K 1/22; H02K 1/27; H02K 1/2706; H02K 1/274; H02K 1/2746; H02K 1/2753; H02K 1/276; H02K 1/2766; H02K 1/2773; H02K 1/278; H02K 21/029
USPC .............................. 310/156.01–156.57, 156.7
See application file for complete search history.

(56) References Cited

U.S. PATENT DOCUMENTS

| | | | | |
|---|---|---|---|---|
| 7,598,645 | B2 * | 10/2009 | Ley ...................... | H02K 1/2766 310/156.56 |
| 8,624,457 | B2 * | 1/2014 | Sakai ................... | H02K 1/2766 310/156.43 |
| 2012/0091848 | A1 * | 4/2012 | Sakai ................... | H02K 1/2766 310/156.43 |
| 2020/0014289 | A1 * | 1/2020 | Ko ....................... | H02K 21/029 |
| 2024/0258889 | A1 * | 8/2024 | Itasaka ................ | H02K 1/2766 |
| 2024/0258893 | A1 * | 8/2024 | Itasaka ................ | H02K 21/029 |

FOREIGN PATENT DOCUMENTS

JP 2021027700 A 2/2021

* cited by examiner

*Primary Examiner* — Maged M Almawri
(74) *Attorney, Agent, or Firm* — Alleman Hall & Tuttle LLP

(57) ABSTRACT

A structure of a rotor changeable of a magnetic force is provided, which includes a rotor core and a plurality of magnetic pole parts disposed therein. Each magnetic pole part includes a radially-magnetized fixed magnetic-force magnet and a circumferentially-magnetized variable magnetic-force magnet. A cavity part is disposed between the fixed magnetic-force magnet and the variable magnetic-force magnet. The cavity part has a cross-section extending from an end part of the fixed magnetic-force magnet toward an opposing surface. The cavity part is formed so that a distance between the variable magnetic-force magnet and the cavity part in the circumferential direction becomes larger as the cavity part approaches the opposing surface, and a width of the cavity part in the circumferential direction becomes smaller as the cavity part separates from the fixed magnetic-force magnet in the radial direction.

8 Claims, 9 Drawing Sheets

ROTOR STRUCTURE

TECHNICAL FIELD

The art disclosed herein relates to a structure of a rotor which constitutes a drive motor suitable for driving an automobile.

BACKGROUND OF THE DISCLOSURE

In recent years, electrification of automobiles, such as hybrid vehicles and electric vehicles, has progressed. Drive motors mounted on automobiles are required to achieve low-speed but high-torque output when operating at low speeds, and on the other hand, required to achieve high-speed but low-torque output when operating at high speeds. Within such a wide range, the drive motors are required to achieve a stable output.

A permanent magnet synchronous motor is used widely for this kind of drive motor, and in order to output the high torque, a permanent magnet with a powerful magnetic force is incorporated into a rotor. The onboard drive motor uses a battery as its power source, and is driven by an inverter controlling electric current supplied to the drive motor. Therefore, current exceeding the voltage of the battery or the capacity of the inverter cannot be supplied to the drive motor.

Although a counter electromotive force also increases with the increase of the rotational speed, since the current amount is limited, the rotational speed which can be outputted by the drive motor is limited. Therefore, in the control of the drive motor, a magnetic-field weakening control (magnetic-flux weakening control) which weakens an interlinkage flux by supplying a given current to the stator is generally performed. The magnetic-field weakening control enables the high-speed output exceeding the limitation, but copper loss and iron loss increase.

On the other hand, lately, a drive motor which is able to change the magnetic force of the rotor by using a permanent magnet with a small coercive force (hereinafter, referred to as a "variable magnetic-force motor") has attracted attention. If the magnetic force of the rotor can be changed according to the driving state, increase in the output, improvement in efficiency, etc. of the drive motor can be realized as well as the reduction in the counter electromotive force, and therefore, fuel efficiency and electricity efficiency of the automobile can be improved.

For example, JP2021-027700A discloses a variable magnetic-force motor in which permanent magnets able to change their magnetic force (variable magnetic-force magnets) are attached to the rotor along with permanent magnets not able to change their magnetic force (fixed magnetic-force magnets).

When the drive motor of an automobile is a variable magnetic-force motor, the magnetic force of the rotor changes during operation of the automobile. Therefore, operation scenes in which the motor performance is influenced, such as a scene of increasing the magnetic force of the rotor and a scene of decreasing the magnetic force of the rotor, increase more than in the conventional drive motor in which the magnetic force of the rotor does not change.

Therefore, in order to effectively utilize the variable magnetic-force motor, it is necessary to optimize the structure of the rotor for each of such various operation scenes. In this respect, the variable magnetic-force motor disclosed in JP2021-027700A has room for improvement.

For example, the variable magnetic-force motor disclosed in JP2021-027700A has a disadvantage that reluctance torque cannot fully be utilized.

That is, a d-axis which extends radially from the center of the rotor through each magnetic pole center intersects perpendicularly at its width center part a magnetic pole surface which is long in the circumferential direction of the fixed magnetic-force magnet, and another fixed magnetic-force magnet is disposed close to both sides of the fixed magnetic-force magnet. A q-axis which extends radially from the center of the rotor through each magnetic pole center intersects perpendicularly at its width center part an end surface of the variable magnetic-force magnet which is long in the radial direction, and a large cavity (flux barrier) exists radially inward thereof.

The magnetic reluctances of the magnet and the cavity are overwhelmingly higher than the core with high magnetic permeability. Thus, in the variable magnetic-force motor disclosed in JP2021-027700A, it is difficult for the magnetic flux to pass through both the d-axis and the q-axis in the rotor. Since a large salient pole difference (Lq−Ld) cannot be achieved, the variable magnetic-force motor disclosed in JP2021-027700A does not effectively utilize the reluctance torque.

SUMMARY OF THE DISCLOSURE

The art disclosed herein aims at realization of a structure of a rotor which can be effectively adapted to various operation scenes of a variable magnetic-force motor. Particularly, the art which enables effective use of both magnet torque and the reluctance torque is disclosed.

The disclosed art relates to a structure of a rotor that constitutes a drive motor and has a changeable magnetic force.

The structure includes a rotor core opposing a stator via a gap, and a plurality of magnetic pole parts disposed in the rotor core so that N-poles and S-poles are lined up alternately in a circumferential direction of the rotor core along an opposing surface. Each of the magnetic pole parts includes a fixed magnetic-force magnet disposed in the rotor core so that a magnetic force thereof is oriented in a radial direction of the rotor core, and a variable magnetic-force magnet disposed so that a magnetic force thereof is oriented in the circumferential direction, the variable magnetic-force magnet being disposed in a part of the rotor core on an opposing surface side of the fixed magnetic-force magnet, at a position adjacent in the circumferential direction to the fixed magnetic-force magnet.

A cavity part is disposed in a part of the rotor core between the fixed magnetic-force magnet and the variable magnetic-force magnet when seen in an axial direction of the rotor core. The cavity part has an axial cross-section extending from an end part of the fixed magnetic-force magnet toward the opposing surface. The cavity part is formed so that a distance between the variable magnetic-force magnet and the cavity part in the circumferential direction becomes larger as the cavity part approaches the opposing surface, and a width of the cavity part in the circumferential direction becomes smaller as the cavity part separates from the fixed magnetic-force magnet in the radial direction.

That is, according to this configuration, the fixed magnetic-force magnet (i.e., a magnet fixed and not able to change its magnetic force) and the variable magnetic-force magnet (i.e., a magnet able to change its magnetic force) are disposed in each magnetic pole part. Thus, by magnetizing or demagnetizing the variable magnetic-force magnet, the total magnetic force achieved at each magnetic pole part can be changed within a given range.

When seen in the axial direction, the variable magnetic-force magnet is disposed in a part of the rotor core on the opposing surface side of the fixed magnetic-force magnet, at a position adjacent in the circumferential direction to the fixed magnetic-force magnet. Therefore, the variable magnetic-force magnet is easily influenced by the magnetic field from the stator, and is easily magnetized in the circumferential direction.

Further, in the part of the rotor core between these magnets, the cavity part having the axial cross-section extending from the end part of the fixed magnetic-force magnet toward the opposing surface is disposed. That is, the cavity part intercepts between the magnetic pole surface of the fixed magnetic-force magnet and the magnetic pole surface of the variable magnetic-force magnet. Therefore, it can be suppressed that the magnetic flux which exits from the fixed magnetic-force magnet and the magnetic flux which exits from the variable magnetic-force magnet interfere with each other, which enables effective utilization of both magnetic forces.

The cavity part is formed so that the distance between the variable magnetic-force magnet and the cavity part in the circumferential direction becomes larger as the cavity part approaches the opposing surface, and the width of the cavity part in the circumferential direction becomes smaller as the cavity part separates from the fixed magnetic-force magnet in the radial direction. That is, the axial cross-section of the cavity part is formed to be tapered so that it separates from the variable magnetic-force magnet as it extends radially outward. Thus, the magnetic flux which exits from the variable magnetic-force magnet is guided radially outward by the cavity part, and joins with the magnetic flux which exits from the fixed magnetic-force magnet smoothly, without being repelled. Therefore, the magnet torque can be utilized effectively.

As described above, the reluctance torque increases as the salient pole difference (Lq−Ld) increases. That is, the reluctance torque increases as Lq becomes larger (i.e., a flow of the q-axis magnetic flux which flows from the stator side to the rotor centering on the q-axis becomes easier), and as Ld becomes smaller (i.e., a flow of the d-axis magnetic flux which flows from the stator side to the rotor centering on the d-axis becomes more difficult).

In this regard, since the cavity part is tapered radially outward, the magnetic reluctance becomes smaller as it goes radially outward. Therefore, even inside the cavity part, it is comparatively easy for the magnetic flux to flow through the radially outward part of the cavity part. Therefore, the d-axis magnetic flux which flows near the d-axis and the q-axis magnetic flux which flows near the q-axis may flow through the radially outward part of the cavity part.

However, the d-axis magnetic flux flows in a direction in which the circumferential width of the cavity part increases, and flows downstream to the variable magnetic-force magnet. Therefore, the d-axis magnetic flux flows with difficulty. On the other hand, the q-axis magnetic flux flows in a direction in which the circumferential width of the cavity part does not increase, and flows downstream to the magnetic path comprised of the rotor core. Thus, the q-axis magnetic flux flows easily.

Therefore, according to this rotor structure, the q-axis magnetic flux flows easily, while the d-axis magnetic flux flows with difficulty. Since the salient pole difference is large, the large reluctance torque can be achieved. Therefore, as well as the magnet torque, the reluctance torque can also be utilized effectively.

An auxiliary fixed magnetic-force magnet may be disposed in a part of the rotor core between the fixed magnetic-force magnet and the opposing surface in a state where an end part thereof is located adjacent to the cavity part, the auxiliary fixed magnetic-force magnet being configured to reinforce the magnetic force of the fixed magnetic-force magnet.

According to this configuration, the magnetic torque can be further reinforced. In addition, since the d-axis magnetic flux near the d-axis directly opposes the auxiliary fixed magnetic-force magnet with the large magnetic reluctance, it needs to bypass the auxiliary fixed magnetic-force magnet, and thus flows with more difficulty. On the other hand, since the q-axis magnetic flux flows toward the part between the cavity part and the auxiliary fixed magnetic-force magnet from an obliquely lateral side, it flows easily. Therefore, the salient pole difference further increases, which increases the reluctance torque.

The cavity part may include a radially extending part tapered from an end part of the fixed magnetic-force magnet toward the opposing surface, and a circumferentially extending part tapered from a base end part of the radially extending part toward the variable magnetic-force magnet. The variable magnetic-force magnet may include a first variable magnetic-force magnet separated from the cavity part, and a second variable magnetic-force magnet disposed so as to extend from a tip-end part of the circumferentially extending part toward the opposing surface in a state where the second variable magnetic-force magnet is adjacent to the first variable magnetic-force magnet.

According to this configuration, since the magnetic path between the second variable magnetic-force magnet and the tip-end part of the circumferentially extending part is intercepted, the magnetic flux of the variable magnetic-force magnet which exits from the magnetic pole surface of the second variable magnetic-force magnet is guided radially outward by the cavity part, without leaking. Therefore, the magnet torque can be large.

Further, since the magnetic path exists between the first variable magnetic-force magnet and the second variable magnetic-force magnet, the q-axis magnetic flux which flows near the q-axis flows easily. Therefore, the reluctance can also be large.

DETAILED DESCRIPTION OF THE DISCLOSURE

Hereinafter, the disclosed art is described. However, the following description is merely illustration essentially. The disclosed art relates to a structure of a rotor which has a changeable magnetic force. It is particularly suitable for a drive motor which drives an automobile. Therefore, in this embodiment, one example of application to an onboard drive motor is illustrated.

<Automobile Which Travels by Drive Motor>

Figure 1:
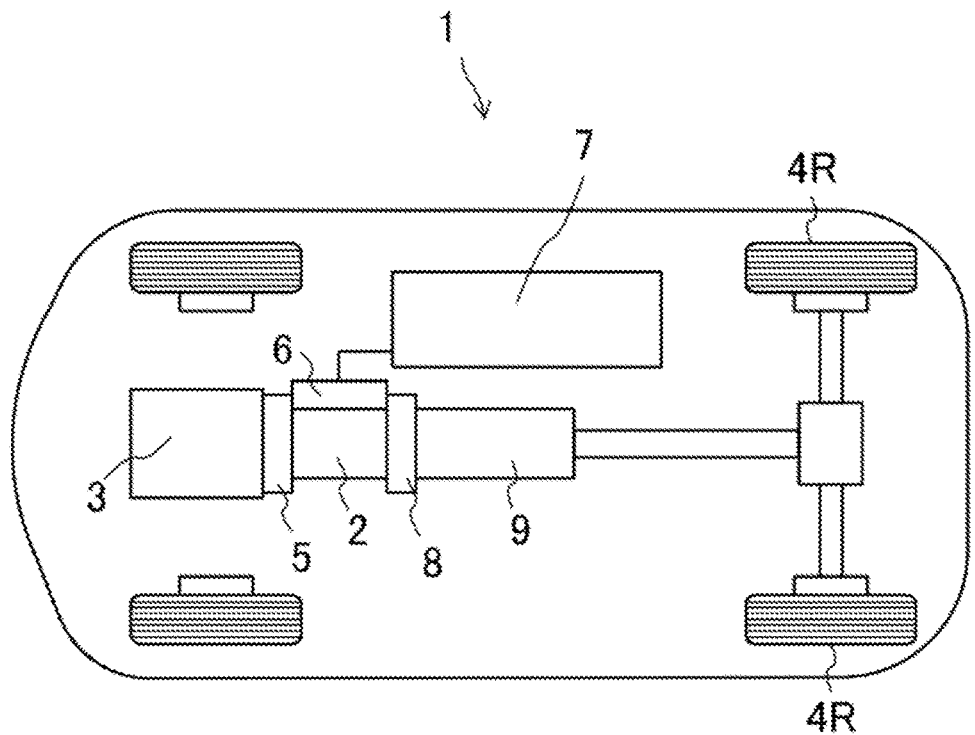
FIG. 1 is a view illustrating an automobile to which the disclosed art is applied.

FIG. 1 illustrates an automobile 1 which travels by a drive motor. This automobile 1 is a hybrid vehicle. As a drive source of the automobile 1, an engine 3 is mounted thereon, in addition to a drive motor 2 (variable magnetic-force motor) to which the art to disclose is applied. These collaboratively rotate two driving wheels 4R. Therefore, the automobile 1 travels.

In the case of this automobile 1, the engine 3 is disposed at the front side of the vehicle body, and the driving wheels 4R are disposed at the rear side of the vehicle body. That is, this automobile 1 is referred to as "FR (front-engine, rear wheel drive) vehicle." Further, the engine 3 is mainly used as the drive source of this automobile 1, and the drive motor 2 is used to assist the drive of the engine 3 (referred to as "mild hybrid"). The drive motor 2 is also used as a power generator (referred to as "regenerator").

The engine 3 is an internal combustion engine which combusts using gasoline as fuel, for example. The engine 3 may be a diesel engine which uses diesel oil as fuel. The drive motor 2 is coupled to the rear of the engine 3 via a first clutch 5. The drive motor 2 is a permanent magnet synchronous motor which is driven by three-phase alternate current.

However, this drive motor 2 is a variable magnetic-force motor, as described above. Its rotor is provided with a fixed magnetic-force magnet 40 and a variable magnetic-force magnet 50 which will be described later so that the magnetic force is changeable. The structure of the rotor is devised to improve the motor performance (the details will be described later).

The drive motor 2 is coupled to a drive battery 7 via an inverter 6. The drive battery 7 is comprised of a plurality of lithium-ion batteries. The rated voltage of the drive battery 7 is less than 50 V (in detail, 48 V). The drive battery 7 supplies direct current power to the inverter 6. The inverter 6 converts the direct current power into the three-phase alternate current with different phases, and supplies it to the drive motor 2. Therefore, the drive motor 2 rotates.

A transmission 9 is coupled to the rear of the drive motor 2 via a second clutch 8. The transmission 9 is a multi-stage automatic transmission (referred to as "AT"). A rotational motive force outputted from the engine 3 and/or the drive motor 2 is outputted to the transmission 9 through the second clutch 8. The transmission 9 is coupled to a differential gear via a propeller shaft.

The differential gear is coupled to the left and right driving wheels 4R via a pair of driving shafts. When the automobile 1 is propelled (powering), the rotational motive force which is changed in the speed by the transmission 9 is distributed by the differential gear, and the distributed forces are transmitted to the respective driving wheels 4R.

When the automobile 1 slows down (regeneration), energy consumed by the drive motor 2 is recovered. In detail, when the automobile 1 brakes, the first clutch 5 is released while connecting the second clutch 8. Thus, the rotational motive force from the driving wheels rotates the drive motor 2 to generate electricity. This electric power is charged to the drive battery 7 to collect energy.

<Improvement in Fuel Efficiency>

In the case of the hybrid vehicle, since the engine 3 is mainly used when powering, the influence of the drive motor 2 on the fuel efficiency is small. On the other hand, since the drive motor 2 is mainly used when regenerating, the influence of the drive motor 2 on the fuel efficiency is large.

Since the automobile 1 slows down very often, the energy consumed during slowdown is large. Therefore, for the improvement in the fuel efficiency of the hybrid vehicle, it is important to increase the rate of the energy recovery during regeneration.

For that purpose, an increase in the output of the drive motor 2 is effective, and, accordingly, it is effective to enable the change in the magnetic force of a rotor 30 of the drive motor 2 (i.e., to adopt the variable magnetic-force motor as the drive motor 2). It becomes possible to optimize the power factor in a wide operating range if the drive motor 2 is the variable magnetic-force motor, and therefore, the drive motor 2 becomes high in the output.

In addition, by optimizing the power factor (i.e., making the electromagnetic force outputted from a stator 10 substantially in agreement with the magnetic force outputted from the rotor 30), the high output of the drive motor 2 can be achieved. On the other hand, in the case of a normal permanent-magnet synchronous motor, the magnetic force of the rotor 30 is constant. Therefore, the power factor can be optimized only in a part of the operating range.

On the other hand, since the magnetic force of the rotor 30 can be changed if it is a variable magnetic-force motor, the power factor can be optimized in the wide operating range. In addition, if the power factor can be optimized in the wide operating range, the drive motor 2 can achieve the high output. Further, since increased efficiency may also be realized by making improvements, the fuel efficiency of the automobile 1 can be improved.

<Operating Range of Drive Motor>

Figure 2:
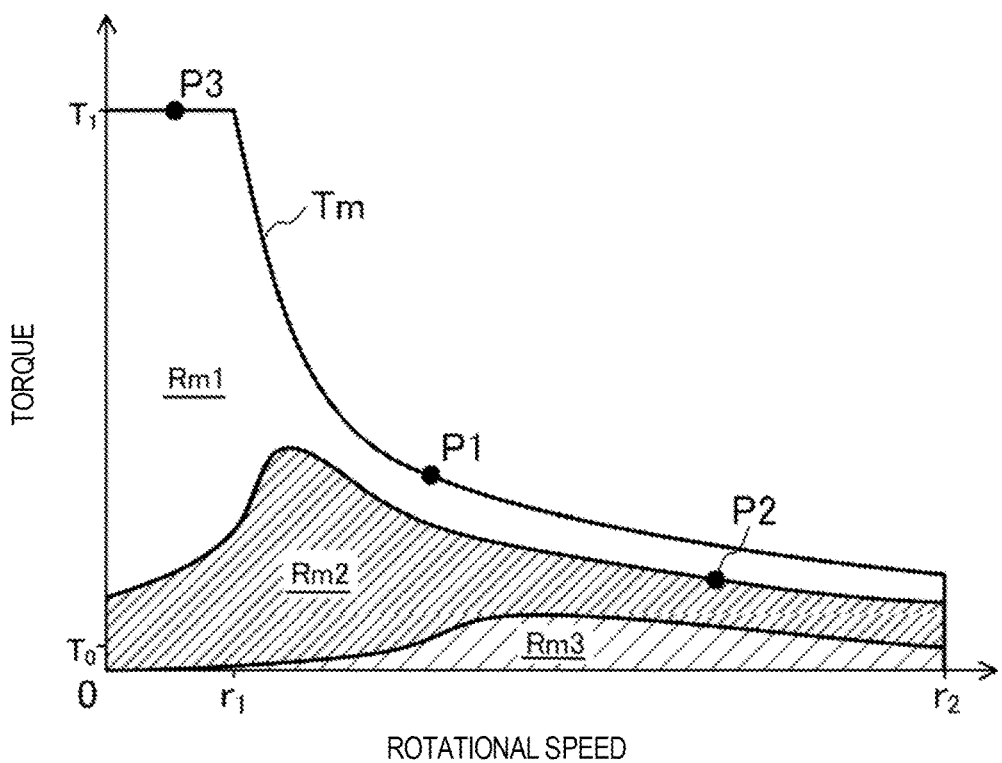
FIG. 2 is a map illustrating an operating range of a drive motor.

FIG. 2 illustrates a map where the operating range of the drive motor 2 is indicated. In this map, the operating range which can be outputted by the drive motor 2 is defined by a load upper limit line Tm indicating an upper limit value of torque (load) at each rotational speed.

In detail, in a low-speed range up to a given engine speed $r_1$, the upper limit of the torque is held at a maximum torque $T_1$. In a middle-speed range and a high-speed range where the engine speed is higher than the low-speed range, the upper limit of the torque is gradually decreased until the engine speed reaches an upper limit $r_2$. The operating range of the variable magnetic-force motor is divided into a plurality of magnetizing areas according to the magnetic force of the rotor 30 so that the power factor is optimized. In the illustrated map, it is divided into three magnetizing areas.

That is, it is divided into a first magnetizing area Rm1 which includes the maximum torque $T_1$ and extends on the high-load side along the load upper limit line, a second magnetizing area Rm2 which extends on the low-load side of the first magnetizing area Rm1, and a third magnetizing area Rm3 which extends on the low-load side of the second magnetizing area Rm2 and includes a torque $T_0$ at which the drive motor 2 idles at the high-speed side (a torque which does not contribute to traveling of the automobile 1).

As for these magnetizing areas, optimal magnetic forces corresponding to respective outputs are set. Normally, the magnetic force of the first magnetizing area Rm1 is larger than the magnetic force of the second magnetizing area Rm2, and the magnetic force of the third magnetizing area Rm3 is set smaller than the magnetic force of the second magnetizing area Rm2.

The magnetizing area is estimated based on the operating state of the drive motor 2 while the automobile 1 travels, and when transitioning through the magnetizing area, the magnetic force of the rotor 30 is changed according to the magnetic force of the corresponding magnetizing area. For example, when transitioning from the second magnetizing area Rm2 to the first magnetizing area Rm1, the drive motor 2 is magnetized. When transitioning from the second magnetizing area Rm2 to the third magnetizing area Rm3, the drive motor 2 is demagnetized.

Although the details will be described later, when magnetizing or demagnetizing, a large pulse-shaped current is supplied to given coils 12 at a timing when the rotor 30 becomes at a given position with respect to the stator 10. Thus, a strong magnetic field is generated from the stator 10 to the variable magnetic-force magnet 50 which is a target to be processed. Therefore, the variable magnetic-force magnet 50 is magnetized until a given magnetic force is obtained.

The direction of the magnetic field generated is opposite between magnetizing and demagnetizing. In magnetizing, magnetization is performed so that the magnetic force of the variable magnetic-force magnet 50 is oriented in the same direction as the magnetic force of the fixed magnetic-force magnet 40. In demagnetizing, magnetization is performed so that the magnetic force of the variable magnetic-force magnet 50 is oriented in the opposite direction to the magnetic force of the fixed magnetic-force magnet 40. Depending on the magnetization state, the direction of the magnetic force of the variable magnetic-force magnet 50 can be reversed, or changed in the magnitude of the magnetic force.

However, magnetization is limited by onboard apparatuses. That is, in order to magnetize the magnetic force of the variable magnetic-force magnet 50 strongly, it is necessary to supply large current to the drive motor 2, and therefore, magnetization is limited by the voltage of the drive battery 7 and the capacity of the inverter 6.

Although increasing the sizes of these apparatuses may be considered, it is difficult to increase the sizes because they are mounted on the vehicle. Therefore, according to the art disclosed herein, the structure of the drive motor 2 (particularly, the structure of the rotor 30) is devised so that magnetization can be conducted appropriately under the limited condition using the existing apparatuses.

<Structure of Drive Motor>

Figure 3:
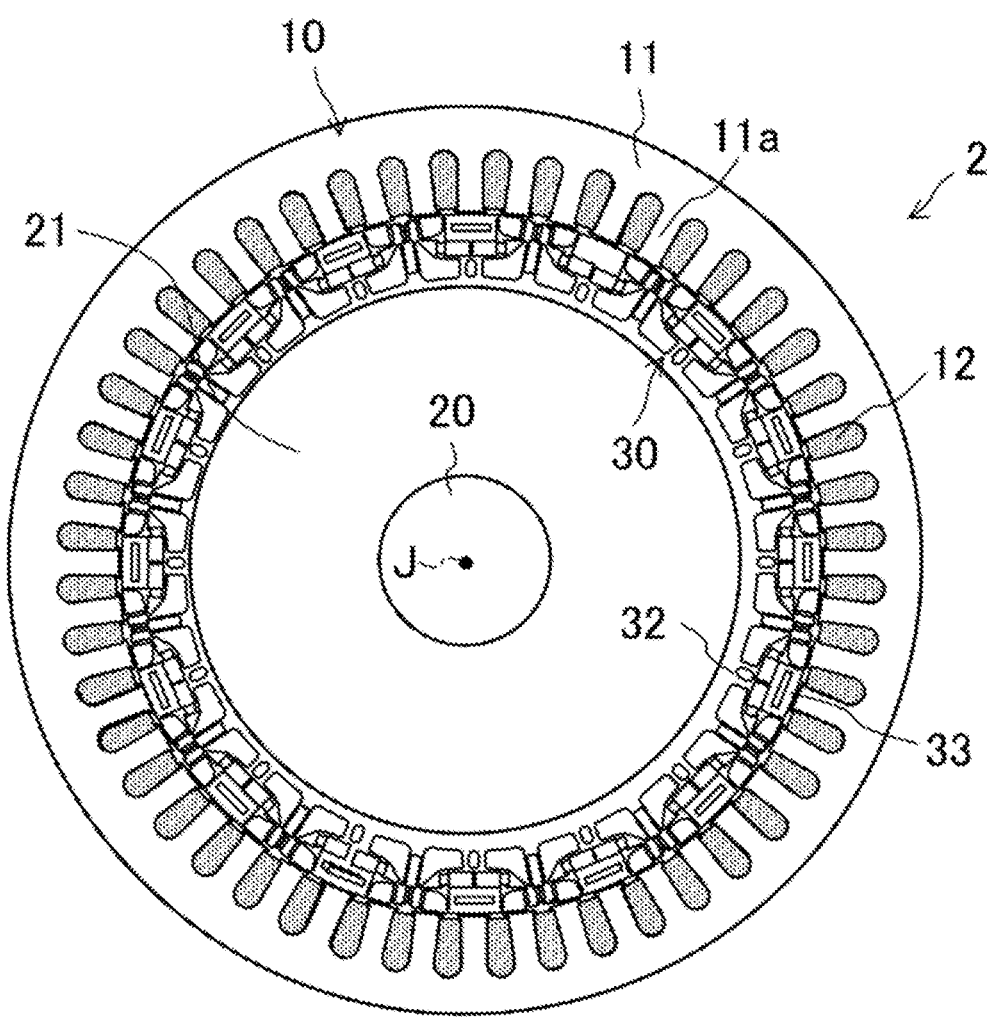
FIG. 3 is a view illustrating a cross-sectional structure of the drive motor.

FIG. 3 illustrates a cross-sectional structure of the drive motor 2 when seen in the axial direction. The illustrated drive motor 2 is comprised of the stator 10, the rotor 30, a shaft 20, and a hub 21. Note that in the following description, a "rotation axis direction" or an "axial direction" indicates a direction in which a rotation axis J extends. The radial direction indicates a direction of a radius centering on the rotation axis J. A "circumferential direction" indicates a direction of the circumference centering on the rotation axis J.

The stator 10 is comprised of a cylindrical member, and is accommodated in a motor case (not illustrated) which is fixed to the vehicle body of the automobile 1. The stator 10 has a stator core 11 with an annular shape in the axial cross-section, and a plurality of coils 12. The stator core 11 is constituted by laminating in the axial direction a plurality of steel plates with high magnetic permeability. The coil 12 is constituted by winding electric wires around the stator core 11.

In detail, a plurality of (48) teeth 11a which protrude radially inward at regular intervals are provided to the stator core 11. The plurality of coils 12 are formed by winding electric wires in spaces (slots) formed between the teeth 11a in given order. These coils 12 constitute a three-phase coil group which is comprised of U-phase, V-phase, and W-phase, which differ in the phase of electric current which flows therethrough. The coils 12 of the phases are disposed in the order in the circumferential direction.

The rotor 30 is comprised of a member with an annular shape in the axial cross-section, and is disposed inside the stator 10 (referred to as "inner rotor type"). An outer circumferential surface 30a of the rotor 30 opposes to an inner circumferential surface of the stator 10 via a gap 31 (see FIG. 4). The rotor 30 has a rotor core 32 with an annular shape in the axial cross-section, and a plurality of (16) magnetic pole parts 33 comprised of N-poles and S-poles which are provided so that the magnetic force is oriented radially outward.

The rotor core 32 is comprised of a member with the annular shape in the axial cross-section which opposes to the stator 10 via the gap 31, and is constituted by laminating in the axial direction a plurality of steel plates with high magnetic permeability. The magnetic pole parts 33 are disposed so that the N-poles and the S-poles are lined up alternately in the circumferential direction along an outer circumferential surface of the rotor core 32 (the same as the outer circumferential surface of the rotor 30, which may also be referred to as "the opposing surface 30a").

Note that although in this embodiment the drive motor 2 with 16 poles and 48 slots is illustrated, the slot combination of the drive motor 2 is not limited to this configuration. For example, the slot combination may be constituted by the magnetic poles of a multiple of two (2N), and the slots of a multiple of three (3M) (here, N and M are integers). Particularly, when mounting it on a vehicle, it is preferred to set the number of magnetic poles within a range of 8 or more and 20 or less, because of the motor size, the demanded output, and limitations of the structure of the rotor 30 (described later).

The rotor 30 is integrated with the shaft 20 which is supported pivotally by the motor case via the hub 21. Therefore, the rotor 30, the hub 21, and the shaft 20 are constituted rotatably centering on the rotation axis J.

(Details of Rotor Structure)

Figure 4:
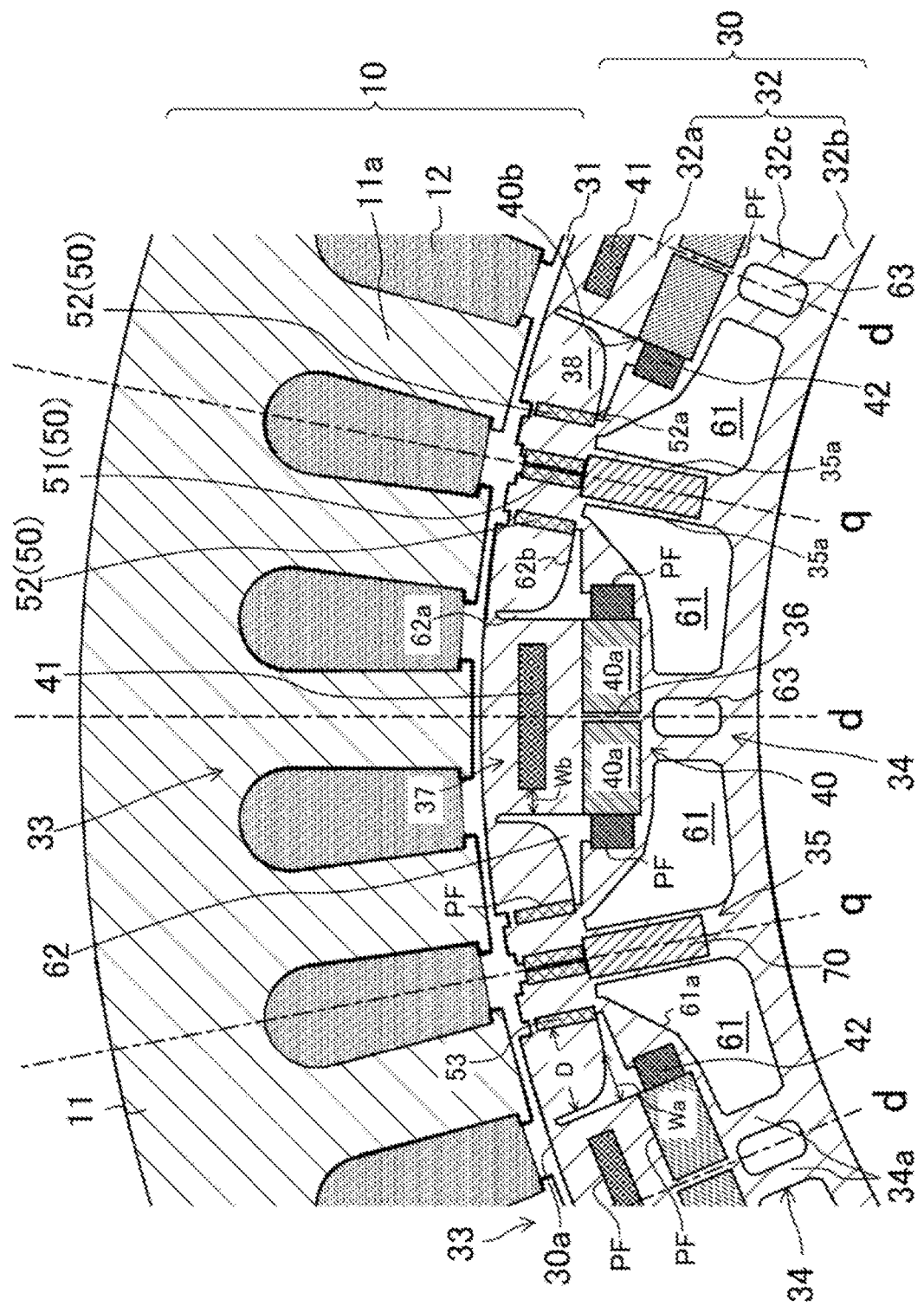
FIG. 4 is a view in which a part of a magnetic pole part in FIG. 3 is enlarged.

FIG. 4 illustrates a view in which a part of the magnetic pole part 33 in FIG. 3 is enlarged. A line which radially extends from the rotation axis J and passes through the center of each magnetic pole part 33 in the circumferential direction indicates a d-axis. A line which extends radially from the rotation axis J and passes through the center between two adjacent magnetic pole parts 33 indicates a q-axis.

The rotor core 32 is comprised of a flange part 32a, a base part 32b, and a connecting part 32c. The flange part 32a is a part with an annular shape in the axial cross-section, which opposes to the stator 10. The base part 32b is a part with an annular shape in the axial cross-section, which is fixed to the hub 21. The base part 32b is separated from the flange part 32a with a given distance therebetween, and is located inward of the flange part 32a. The flange part 32a and the base part 32b are connected together by the connecting part 32c.

The connecting part 32c includes a plurality of first pillar parts 34 and a plurality of second pillar parts 35. In detail, the first pillar part 34 is provided for every d-axis. The second pillar part 35 is provided for every q-axis. By being defined by the connecting part 32c, a plurality of cavity parts (a first cavity part 61 and a third cavity part 63 which will be described later) are formed in a part between the flange part 32a and the base part 32b in the rotor core 32.

Each magnetic pole part 33 is comprised of the fixed magnetic-force magnet 40, a first auxiliary fixed magnetic-force magnet 41 (auxiliary fixed magnetic-force magnet), a second auxiliary fixed magnetic-force magnet 42, the variable magnetic-force magnet 50, and the cavity parts. The variable magnetic-force magnet 50 includes a first variable magnetic-force magnet 51 and a second variable magnetic-force magnet 52. The cavity part includes the first cavity part 61, a second cavity part 62, and the third cavity part 63.

The fixed magnetic-force magnet 40, the first auxiliary fixed magnetic-force magnet 41, and the second auxiliary fixed magnetic-force magnet 42 are magnets in which the residual magnetic flux density of the magnetic body is unchangeable (i.e., the magnetic force is constant and does not change), similarly to a conventional permanent magnet. A magnet with high magnetic flux density and large coercive force, such as a neodymium magnet, is used for the fixed magnetic-force magnet 40. These fixed magnetic-force magnets 40 may be different magnetic bodies, but in this rotor 30, the same magnetic bodies are used.

On the other hand, the variable magnetic-force magnet 50 is a magnet in which the residual magnetic flux density of the magnetic body is changeable (i.e., the magnetic force is changeable). A magnet with high flux density but small coercive force, such as an alnico magnet, is used for the variable magnetic-force magnet 50. The first variable magnetic-force magnet 51 and the second variable magnetic-force magnet 52 may be different magnetic bodies, but, in this rotor 30, the same magnetic bodies are used.

Therefore, with large current (for example, 750 Arms) which is outputtable from the drive battery 7 and the inverter 6, the fixed magnetic-force magnet 40 cannot be magnetized, but the variable magnetic-force magnet 50 can be magnetized and its magnetic force can be changed. Note that the variable magnetic-force magnet 50 can hardly be magnetized with current when normally driving the drive motor 2. Therefore, the variable magnetic-force magnet 50 also functions as a permanent magnet.

The fixed magnetic-force magnet 40 is an element used as the main body of each magnetic pole part 33, and its magnetic force is the strongest. The axial cross-section of the fixed magnetic-force magnet 40 is formed in a rectangular shape in which the long side is sufficiently larger than the short side (for example, doubled or more, and 5 times or less). The side surfaces on the long side of the fixed magnetic-force magnet 40 constitute magnetic pole surfaces PF which are comprised of an S-pole and an N-pole through which a magnetic flux pass. The fixed magnetic-force magnet 40 is disposed on the center side of the flange part 32a in a state where the magnetic pole surfaces PF are oriented perpendicular to the d-axis so that the magnetic force is oriented in the radial direction centering on the d-axis.

The fixed magnetic-force magnet 40 which is long in the circumferential direction is bisected in line symmetry with respect to the d-axis. That is, the fixed magnetic-force magnet 40 is comprised of a pair of magnet pieces 40a located in line symmetry with respect to the d-axis. Therefore, a part of the flange part 32a at the center of the circumferential width of the fixed magnetic-force magnet 40 is provided with a bar-shaped part in which the axial cross-section extends in the radial direction (an inside coupling part 36 which is a part of the rotor core 32).

The first auxiliary fixed magnetic-force magnet 41 is an auxiliary element of each magnetic pole part 33, and has a function to reinforce the magnetic force of the fixed magnetic-force magnet 40. Its magnetic force is the second strongest subsequently to the fixed magnetic-force magnet 40. The axial cross-section of the first auxiliary fixed magnetic-force magnet 41 is formed in a rectangular shape in which both the short side and the long side are smaller than the fixed magnetic-force magnet 40. The side surfaces on the long side of the first auxiliary fixed magnetic-force magnet 41 also constitute the magnetic pole surfaces PF.

The first auxiliary fixed magnetic-force magnet 41 is disposed in a part of the flange part 32a between the opposing surface 30a and the fixed magnetic-force magnet 40 in a state where the magnetic pole surfaces PF are oriented perpendicular to the d-axis, similarly to the fixed magnetic-force magnet 40. The magnetic pole surfaces PF (N-pole or S-pole) of the first auxiliary fixed magnetic-force magnet 41 and the fixed magnetic-force magnet 40, which are lined up in the radial direction, are oriented in the same direction so that the magnetic force of the fixed magnetic-force magnet 40 is reinforced.

The second auxiliary fixed magnetic-force magnet 42 is an auxiliary element of each magnetic pole part 33, and has a function to guide the magnetic flux of the fixed magnetic-force magnet 40. Two second auxiliary fixed magnetic-force magnets 42 are provided to each magnetic pole parts 33. Unlike the fixed magnetic-force magnet 40, the axial cross-section of the second auxiliary fixed magnetic-force magnet 42 is formed in a rectangular shape in which the long side is slightly longer than the short side. The magnetic pole surfaces PF of the second auxiliary fixed magnetic-force magnet 42 are comprised of the long-side side surfaces.

Each second auxiliary fixed magnetic-force magnet 42 is disposed in an end part of the fixed magnetic-force magnet 40 so that an end surface on the long side which constitutes the magnetic pole surface PF contacts an end surface of the fixed magnetic-force magnet 40 in the circumferential direction. The second auxiliary fixed magnetic-force magnets 42 are disposed in line symmetry with respect to the d-axis.

(Variable Magnetic-Force Magnet)

The variable magnetic-force magnet 50 is disposed in a part of the flange part 32a on the opposing surface 30a side of the fixed magnetic-force magnet 40, and at a position which is adjacent to the fixed magnetic-force magnet 40 in the circumferential direction.

The variable magnetic-force magnet 50 is an element which collaborates with the fixed magnetic-force magnet 40 as the main body of each magnetic pole part 33, and its magnetic force is changeable. The maximum magnetic force of the variable magnetic-force magnet 50 is set equivalent to or below the total magnetic force of the fixed magnetic-force magnet 40 and the first auxiliary fixed magnetic-force magnet 41.

The variable magnetic-force magnets 50 are disposed at positions centering on the q-axis. As described above, the variable magnetic-force magnet 50 includes the first variable magnetic-force magnet 51 and the second variable magnetic-force magnet 52. The center of the circumferential width of the first variable magnetic-force magnet 51 is located on the q-axis. The second variable magnetic-force magnets 52 are provided on both sides of the first variable magnetic-force magnets 51 in the circumferential direction, and are disposed adjacent to the first variable magnetic-force magnets 51.

The first variable magnetic-force magnet 51 and the second variable magnetic-force magnet 52 are comprised of the same magnetic material pieces 53. The axial cross-section of the magnetic material piece 53 is formed in a rectangular shape in which the long side is sufficiently larger than the short side (about 5 times). The length of the long side of the magnetic material piece 53 is substantially the same as the length of the short side of the fixed magnetic-force magnet 40. The first variable magnetic-force magnet 51 and the second variable magnetic-force magnet 52 are sufficiently smaller in the thickness of the axial cross-section than the fixed magnetic-force magnet 40.

A long-side side surface of the magnetic material piece 53 constitutes the magnetic pole surface PF. The magnetic pole surface PF of each magnetic material piece 53 faces in the circumferential direction so that the magnetic force is oriented in the circumferential direction. The first variable magnetic-force magnet 51 is constituted by abutting two magnetic material pieces 53 so that the magnetic material pieces 53 are lined up in the circumferential direction. The second variable magnetic-force magnet 52 is constituted by disposing one magnetic material piece 53 parallel to the first variable magnetic-force magnet 51.

(Cavity Part)

The first cavity part 61 and the third cavity part 63 are formed between the flange part 32a and the base part 32b by being defined by the connecting part 32c, as described above. The second cavity part 62 is formed in the flange part 32a.

In detail, the first pillar part 34 is comprised of a plurality of (in the illustration, 2) parts (outside coupling parts 34a) located radially inward of the fixed magnetic-force magnet 40. Each outside coupling part 34a is provided between the flange part 32a and the base part 32b, and is formed in a pillar shape in which the axial cross-section extends in the radial direction.

The outside coupling parts 34a are disposed in line symmetry with respect to the d-axis in a state where they are separated from each other by a given distance. The third cavity part 63 is formed between these outside coupling parts 34a. The third cavity part 63 has a substantially rectangular shape in the axial cross-section, which extends along the d-axis.

The second pillar part 35 is provided between the flange part 32a and the base part 32b so that it is located radially inward of each variable magnetic-force magnet 50. The axial cross-section of the second pillar part 35 is formed in a pillar shape which extends in the radial direction. The second pillar part 35 is longer in the radial direction than the first pillar part 34. The circumferential width of the second pillar part 35 is larger than that of the first variable magnetic-force magnet 51. The center of the circumferential width of the second pillar part 35 is located on the q-axis.

The second pillar part 35 includes a synthetic resin 70 (nonmagnetic material). That is, the synthetic resin 70 which extends along the second pillar part 35 is embedded in a part of the second pillar part 35 radially inward of the first variable magnetic-force magnet 51. The axial cross-section of the synthetic resin 70 is formed in a rectangular shape in which the circumferential width is slightly smaller than that of the second pillar part 35.

Therefore, in parts of the second pillar part 35 on both sides of the synthetic resin 70, a pair of bar-shaped parts in the axial cross-section (coupling arm parts 35a each of which is a part of the rotor core 32) are formed, which are located radially outward of the first variable magnetic-force magnet 51. Note that the bar shape means that the width is narrower than the pillar shape.

The first cavity part 61 is formed between the first pillar parts 34 and the second pillar part 35. That is, both sides of the first cavity part 61 in the circumferential direction are defined by the first pillar parts 34 and the second pillar part 35, and the radially inside part of the first cavity part 61 is defined by the base part 32b. Two first cavity parts 61 are formed in each magnetic pole part 33 in line symmetry with respect to the d-axis. The radially outward part of the first cavity part 61 is defined by a curved surface 61a which extends from a radially outward end part of the first pillar parts 34 to a radially outward end part of the second pillar part 35.

The curved surface 61a is formed so that it is located close to the fixed magnetic-force magnet 40 and the second auxiliary fixed magnetic-force magnet 42, and extends along the fixed magnetic-force magnet 40 and the second auxiliary fixed magnetic-force magnet 42. The curved surface 61a has an arc shape which bulges radially inward when seen in the axial direction. The axial cross-section of the first cavity part 61 is large. The rotor core 32 is reduced in the weight by the first cavity part 61.

The second cavity part 62 is disposed in a part of the flange part 32a between the fixed magnetic-force magnet 40 and the variable magnetic-force magnet 50 when seen in the axial direction. Two second cavity parts 62 are formed in each magnetic pole part 33 in line symmetry with respect to the d-axis. The axial cross-section of the second cavity part 62 is formed so that it extends from an end part 40b of the fixed magnetic-force magnet 40 (in detail, a corner part located radially outward in the fixed magnetic-force magnet 40) toward the opposing surface 30a of the flange part 32a.

As illustrated in the magnetic pole part 33 on the left side of FIG. 4, the second cavity part 62 is formed so that a distance D between the variable magnetic-force magnet 50 and the second cavity part 62 in the circumferential direction becomes larger as it approaches the opposing surface 30a, and is formed so that a circumferential width Wa of the second cavity part 62 becomes smaller as it separates from the fixed magnetic-force magnet 40 in the radial direction.

In detail, the second cavity part 62 has a part (radially extending part 62a) which is tapered from an end part of the fixed magnetic-force magnet 40 toward the opposing surface 30a, and a part (circumferentially extending part 62b) which is tapered from a base end part of the radially extending part 62a toward the variable magnetic-force magnet 50, and the axial cross-section is formed in an L-shape.

When seen in the axial direction, a side surface of the radially extending part 62a on the d-axis side is linear extending in the radial direction, and a radially-inward side surface of the circumferentially extending part 62b is linear extending in the circumferential direction. A side surface covering the q-axis side of the radially extending part 62a and radially outward of the circumferentially extending part 62b is curved bulging toward an end part of the fixed magnetic-force magnet 40.

A part of the end part 40b of the fixed magnetic-force magnet 40 (in detail, a radially outward part of the end surface of the fixed magnetic-force magnet 40) is exposed to the second cavity part 62, and is in contact with the second cavity part 62 directly. A part of the radially outward end surface of the second auxiliary fixed magnetic-force magnet 42 is also exposed to the second cavity part 62, and is in contact with the second cavity part 62 directly.

Therefore, a first closed area 37 is formed radially outward of the flange part 32a in each magnetic pole part 33, in which both sides in the circumferential direction and radially inward are defined by the two second cavity parts 62 and the magnetic pole surface PF of the fixed magnetic-force magnet 40. The first auxiliary fixed magnetic-force magnet 41 is disposed in the first closed area 37 in a state where both ends are close to the radially extending parts 62a. A circumferential width Wb between each end part of the first auxiliary fixed magnetic-force magnet 41 and each side surface of the radially extending part 62a on the d-axis side is the same.

The first variable magnetic-force magnet 51 is disposed at a position distant from the second cavity part 62, and the second variable magnetic-force magnet 52 is disposed so that it extends from a tip-end part of the circumferentially extending part 62b toward the opposing surface 30a.

In detail, a radially inward end part 52a of the second variable magnetic-force magnet 52 is exposed to the tip-end part of the circumferentially extending part 62b, and is in contact with the second cavity part 62 directly. Therefore, on the opposing surface 30a side of the flange part 32a in each magnetic pole part 33, two second closed areas 38 in which both sides in the circumferential direction and radially inward are defined by the second cavity part 62 and the magnetic pole surface PF of the second variable magnetic-force magnet 52 are formed.

<Devices for Various Operation Scenes of Drive Motor>

As described above, the stable output in the wide operating range is required for the drive motor 2. Further, from the viewpoint of the improvement in the fuel efficiency, the optimization of the power factor is required in the wide operating range. In addition, in the case of the variable magnetic-force motor, magnetizations of which the magnetizing direction is opposite, such as magnetization and demagnetization, are performed.

Therefore, in order to realize the increased output and improved efficiency of the drive motor 2, it is necessary to optimize the flow of magnetic flux according to the various operation scenes. The above-described structure of the rotor 30 is devised to meet the demand.

(Device for the Magnetizing Scene)

As described above, the large current which can be supplied to the drive motor 2 is limited. Therefore, the variable magnetic-force magnet 50 is preferred to be efficiently magnetizable until the magnetic force reaches saturation under such limitation. However, such magnetizing is difficult only by disposing the fixed magnetic-force magnet 40 and the variable magnetic-force magnet 50 at their fundamental positions.

Figure 5:
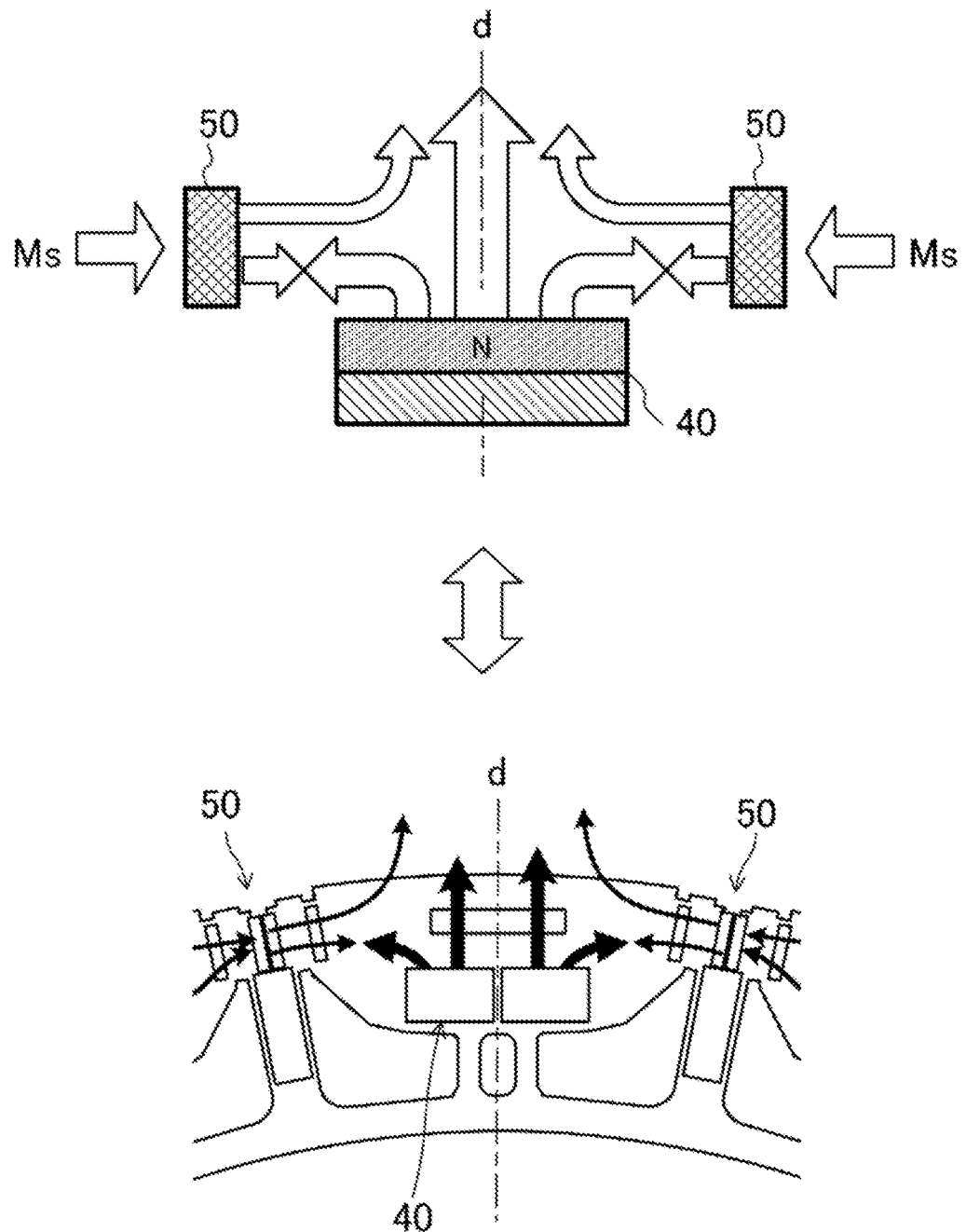
FIG. 5 is a view illustrating a devise for a magnetizing scene (comparative example).

FIG. 5 illustrates such a structure of the rotor 30 as a comparative example. The upper figure is a schematic diagram and the lower figure is a view in which this configuration is applied to the rotor 30 of this embodiment. When magnetizing, the variable magnetic-force magnet 50 is magnetized by making a strong magnetic force (magnetic field) act from radially outward toward the d-axis, as illustrated by an arrow Ms.

From the magnetic pole surface PF (N-pole) which is radially outward part of the fixed magnetic-force magnet 40, a high-density magnetic flux flows radially outward. Since a part of its magnetic flux and the magnetic flux which magnetizes the variable magnetic-force magnet 50 repel each other, the density of the magnetic flux which magnetizes the variable magnetic-force magnet 50 is reduced. As a result, the variable magnetic-force magnet 50 cannot be magnetized efficiently.

Figure 6:
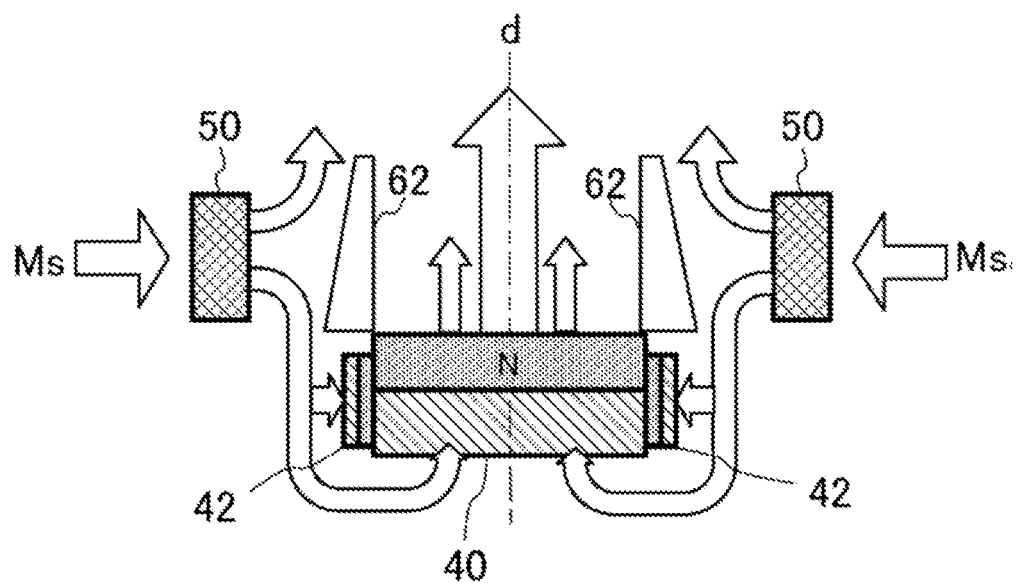
FIG. 6 is a view illustrating a devise for a magnetizing scene (embodiment).
Figure 6:
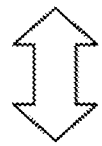
Figure 6:
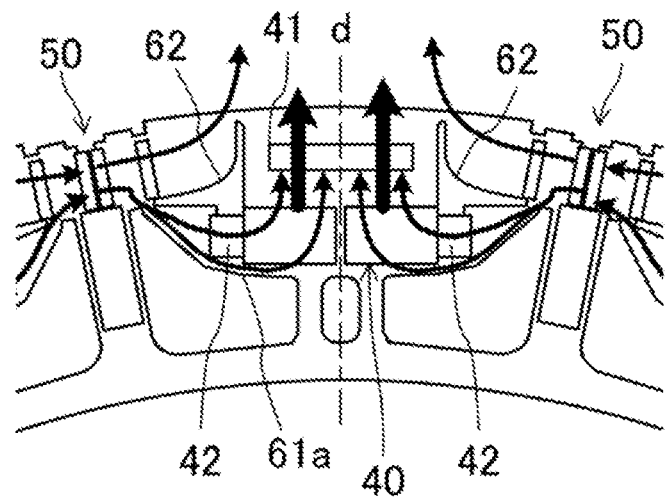

FIG. 6 illustrates the structure of the rotor 30 of this embodiment which is indicated corresponding to FIG. 5. The magnetic reluctance of air is overwhelmingly high compared with the magnetic reluctance of the stator core 11. Therefore, the mutually-repelling magnetic paths are intercepted by providing the second cavity part 62. The magnetic flux has a characteristic to flow by the shortest distance. Therefore, a flow of the magnetic flux in the forward direction from the variable magnetic-force magnet 50 toward the S-pole of the fixed magnetic-force magnet 40 is formed.

Further, in the case of this rotor 30, the flow of the magnetic flux is guided by the curved surface 61a of the first cavity part 61. Moreover, the flow of the magnetic flux is promoted by the second auxiliary fixed magnetic-force magnet 42. As a result, the variable magnetic-force magnet 50 can be magnetized efficiently until the magnetic force reaches saturation, even under the limited condition.

(Device for Demagnetizing Scene and High Power-factor Operation Scene)

In demagnetization, the variable magnetic-force magnet 50 can be demagnetized with a flux density lower than in magnetizing until the magnetic force reaches saturation. However, in demagnetization, the variable magnetic-force magnet 50 is magnetized from the opposite direction from the magnetizing direction (i.e., from the d-axis side).

Therefore, the magnetic field which acts on the variable magnetic-force magnet 50 in demagnetization is substantially the same as the magnetic field which acts in the magnetic-field weakening control, except the difference in the flux density. In detail, in an operation scene where the drive motor 2 is driven in an operating range with middle load to low load and high speed (high power-factor operation scene), for example, at an operation point P1 in FIG. 2 (passing acceleration, etc.), continuous high output at middle speed is required.

At this time, in the drive motor 2, the magnetic-field weakening control is performed so that the magnetic fluxes which collide at the d-axis between the rotor 30 and the stator 10 are canceled out. As a result, in the high power-factor operation scene, the magnetic field in the demagnetizing direction acts on the variable magnetic-force magnet 50 in association with the magnetic-field weakening control.

On the other hand, at an operation point P2 (high-speed cruising, etc.) in FIG. 2, demagnetization is performed when transitioning to the low-load side. In demagnetization, it is necessary to make the strong magnetic field act on the variable magnetic-force magnet 50. Note that when transitioning to the high-load side at the operation point P2, magnetizing as described above is performed.

Figure 7:
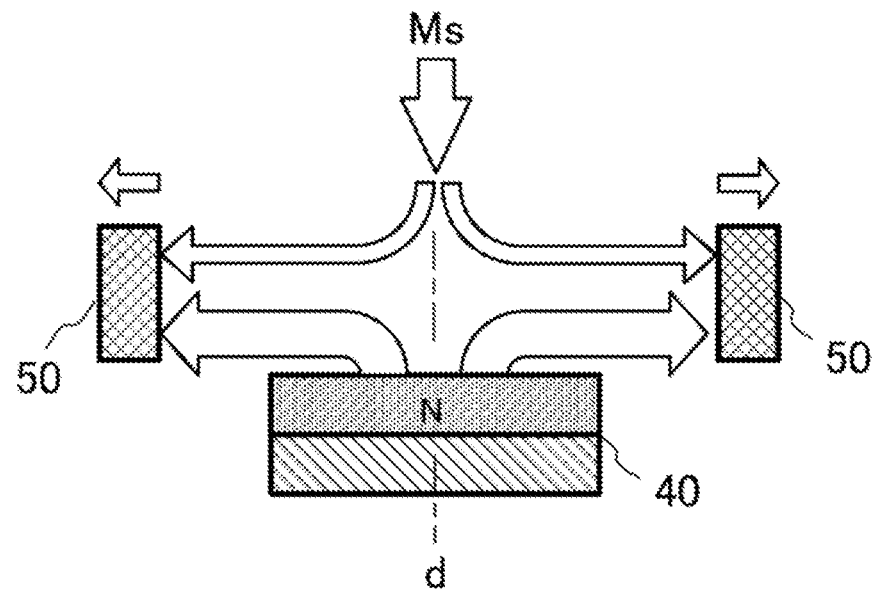
FIG. 7 is a view illustrating a devise for a demagnetizing scene and a high power-factor operation scene.
Figure 7:
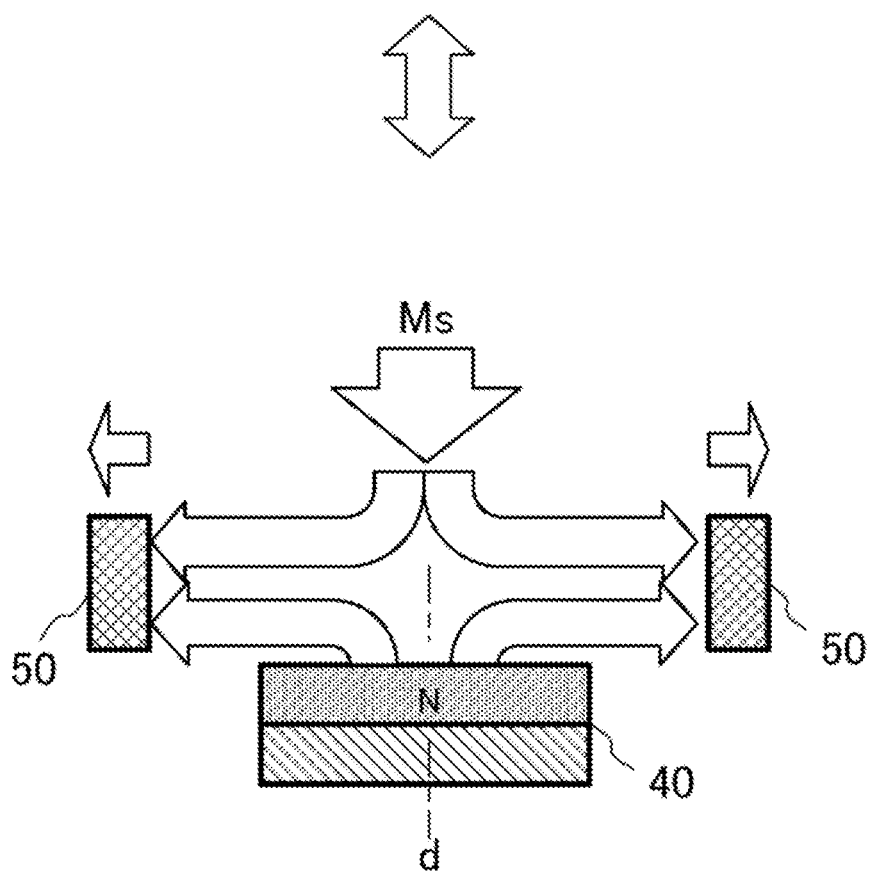

FIG. 7 schematically illustrates the fundamental structure of the rotor 30 in each of a high power-factor operation scene and a demagnetizing scene. The upper figure illustrates the high power-factor operation scene, and the lower figure illustrates the demagnetizing scene.

As illustrated by the arrow Ms, from the stator 10 toward the magnetic pole part 33 of the rotor 30, a weak magnetic flux is applied in the high power-factor operation scene, and a strong magnetic flux is applied in the demagnetizing scene. Each of these magnetic fluxes repels the magnetic flux which goes from the fixed magnetic-force magnet 40 side to the stator 10, and a part thereof goes toward the variable magnetic-force magnets 50 on both sides.

Therefore, in the demagnetizing scene, since the variable magnetic-force magnet 50 can be magnetized by both the amount of magnetic flux, demagnetizing can be performed with large current smaller than magnetizing. Therefore, in the demagnetizing scene, it is preferred to make these magnetic fluxes go toward the variable magnetic-force magnet 50.

On the other hand, in the high power-factor operation scene, if a part of the magnetic flux is deflected toward the variable magnetic-force magnet 50, the stable cancellation of the magnetic fluxes becomes difficult. Further, the variable magnetic-force magnet 50 may unnecessarily be demagnetized. Therefore, in the high power-factor operation scene, it is preferred to suppress the deflection of the magnetic flux toward the variable magnetic-force magnet 50, unlike in the demagnetizing scene.

In this regard, this drive motor 2 is provided with a magnetic flux obstructing structure which obstructs gradually or stepwisely the magnetic path of the magnetic flux which is repelled from the fixed magnetic-force magnet 40 side and goes toward the variable magnetic-force magnet 50 (repelled magnetic flux). In detail, the second closed area 38 constitutes the magnetic flux obstructing structure.

The magnetic reluctance of the magnetic body which constitutes the magnet is almost the same as the magnetic reluctance of the air. These magnetic reluctances are overwhelmingly high compared with the magnetic reluctance of the stator core 11. Therefore, both the second cavity part 62 and the second variable magnetic-force magnet 52 have the equivalent magnetic reluctance, and obstruct the flow of magnetic flux.

Figure 8:
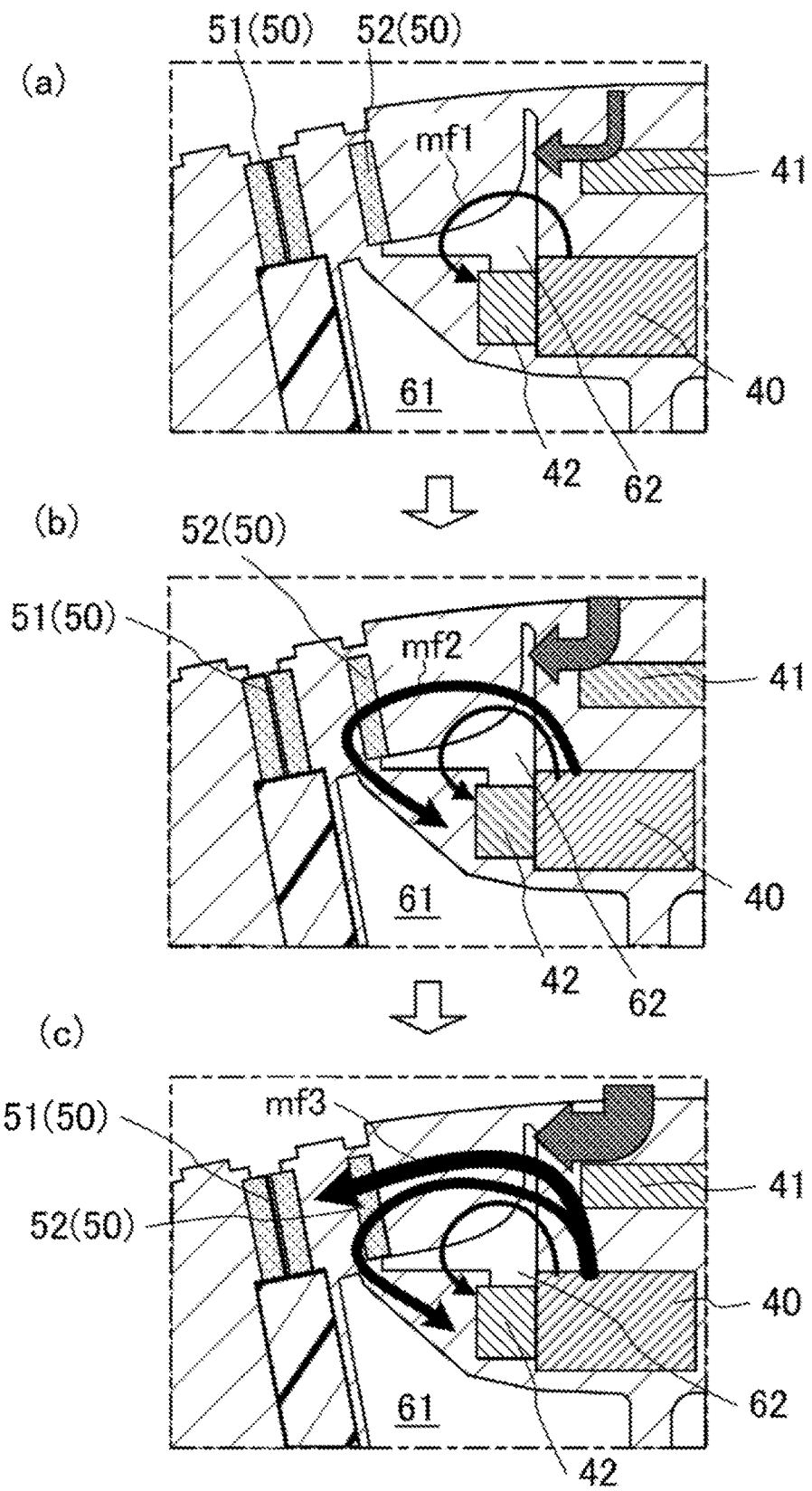
FIG. 8 is a view illustrating a function of a magnetic flux obstructing structure.

Referring to FIG. 8, a function of the magnetic flux obstructing structure is described. As illustrated in (a) of FIG. 8, when the amount of magnetic flux on the stator 10 side is small, the amount of magnetic flux which is repelled and goes from the fixed magnetic-force magnet 40 toward the variable magnetic-force magnet 50 is also small. In addition, most of the flow is obstructed by the second cavity part 62. Since the magnetic flux has the characteristic to flow by the shortest distance, the deflected magnetic flux returns to the fixed magnetic-force magnet 40 by a short-circuited magnetic path as illustrated by an arrow mf1.

As illustrated in (b) of FIG. 8, when the amount of magnetic flux on the stator 10 side increases, a part of the magnetic flux which goes from the fixed magnetic-force magnet 40 toward the variable magnetic-force magnet 50 penetrates the second cavity part 62, without being short-circuited, as illustrated by an arrow mf2, and it goes toward the variable magnetic-force magnet 50. However, this flow is obstructed by the second variable magnetic-force magnet 52. This magnetic flux returns to the fixed magnetic-force magnet 40 by the short-circuited magnetic path.

Further, as illustrated in (c) of FIG. 8, when the amount of magnetic flux on the stator 10 side further increases, a part of the magnetic flux which goes from the fixed magnetic-force magnet 40 toward the variable magnetic-force magnet 50 penetrates the second cavity part 62 and the second variable magnetic-force magnet 52, and flows toward the first variable magnetic-force magnet 51, as illustrated by an arrow mf3. Therefore, it becomes possible to demagnetize both the second variable magnetic-force magnet 52 and the first variable magnetic-force magnet 51. As a result, the contradictory demand of the demagnetizing scene and the high power-factor operation scene can be realized.

(Device for High-torque Operation Scene)

The drive motor 2 is required for the high-torque but low-speed output. For example, at an operation point P3 in FIG. 2 (slope start, etc.), output at high torque is required. In this case, the output cannot be achieved only by increasing the magnetic force of the variable magnetic-force magnet 50 to a saturation magnetic force.

In this regard, this drive motor 2 is devised so that it can operate appropriately also in the high-torque operation scene by effectively utilizing both the magnet torque and the reluctance torque.

That is, the torque outputted from the drive motor 2 which is a permanent magnet synchronous motor is the total torque which can be obtained by adding the magnet torque which originates in the magnet provided to the rotor 30 (the fixed magnetic-force magnet 40 and the variable magnetic-force magnet 50), and the reluctance torque which originates in the salient pole difference of the rotor core 32 (corresponding to Lq–Ld).

Therefore, by utilizing both the magnet torque and the reluctance torque effectively, the maximum torque outputtable from the drive motor 2 increases, and thus the drive motor 2 can operate appropriately also in the high-torque operation scene. Note that Lq is an inductance (equivalent to ease of passing of magnetic flux) at the q-axis, and Ld is an inductance at the d-axis. The reluctance torque increases as the salient pole difference increases.

(Practical Use of Magnet Torque)

Figure 9:
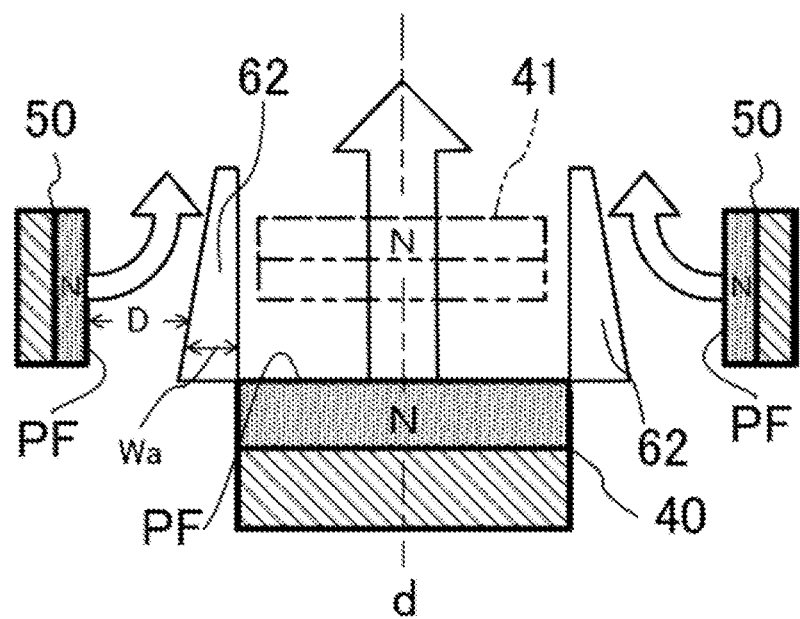
FIG. 9 is a view illustrating practical use of the magnet torque.
Figure 9:
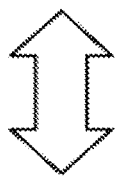
Figure 9:
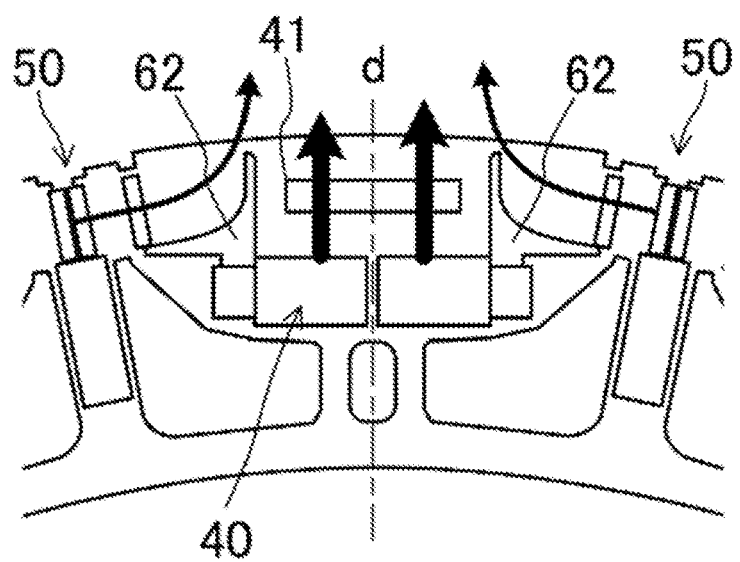

Referring to FIG. 9, practical use of the magnet torque is described. FIG. 9 illustrates the magnetic pole part 33 in which the N-pole of the fixed magnetic-force magnet 40 is oriented radially outward. The upper figure is a schematic diagram illustrating its fundamental configuration, and the lower figure is a view in which the configuration is applied to the rotor 30 of this embodiment.

From the fixed magnetic-force magnet 40, a strong magnetic force which goes toward the stator 10 is generated. Like the rotor 30 of this embodiment, by installing the first auxiliary fixed magnetic-force magnet 41, the magnetic force can further be strengthened to output high torque. The variable magnetic-force magnet 50 in this high-torque operation scene is magnetized until it reaches the saturation magnetic force. Therefore, the magnetic pole surface PF on the d-axis side of the variable magnetic-force magnet 50 is the N-pole, and the magnetic force of the variable magnetic-force magnet 50 becomes the maximum value.

When seen in the axial direction, the second cavity part 62 having a cross section which extends from an end part of the fixed magnetic-force magnet 40 toward the opposing surface 30a is formed in a part of the rotor core 32 between the fixed magnetic-force magnet 40 and the variable magnetic-force magnet 50. Therefore, the part between the magnetic pole surface PF on the radially outward part of the fixed magnetic-force magnet 40 and the magnetic pole surface PF on the d-axis side of the variable magnetic-force magnet 50 is intercepted by the second cavity part 62. Thus, the magnetic flux which exits from the fixed magnetic-force magnet 40 and the magnetic flux which exits from the variable magnetic-force magnet 50 interfering with each other can be suppressed, which enables effective utilization of both magnetic forces.

The distance D between the variable magnetic-force magnet 50 and the second cavity part 62 in the circumferential direction becomes wider as approaching the opposing surface 30a of the stator core 11. The circumferential width Wa of the second cavity part 62 becomes narrower as it separates from the fixed magnetic-force magnet 40 in the radial direction.

That is, the axial cross-section of the second cavity part 62 is formed in the tapered shape so that it separates from the variable magnetic-force magnet 50 as it goes radially outward. Therefore, the magnetic flux which exits from the variable magnetic-force magnet 50 is guided radially outward by the second cavity part 62 so that it joins with the magnetic flux which exits from the fixed magnetic-force magnet 40 smoothly, without being repelled.

Further, the second variable magnetic-force magnet 52 is disposed so that it extends from the tip-end part of the circumferentially extending part 62b toward the opposing surface 30a in the state where it is adjacent to the first variable magnetic-force magnet 51.

That is, since the magnetic path between the second variable magnetic-force magnet 52 and the tip-end part of the circumferentially extending part 62b is intercepted, the magnetic flux of the variable magnetic-force magnet 50 which exits from the magnetic pole surface of the second variable magnetic-force magnet 52 is guided radially outward by the second cavity part 62, without leaking. Therefore, the magnet torque can be utilized effectively.

(Practical Use of Reluctance Torque)

Figure 10:
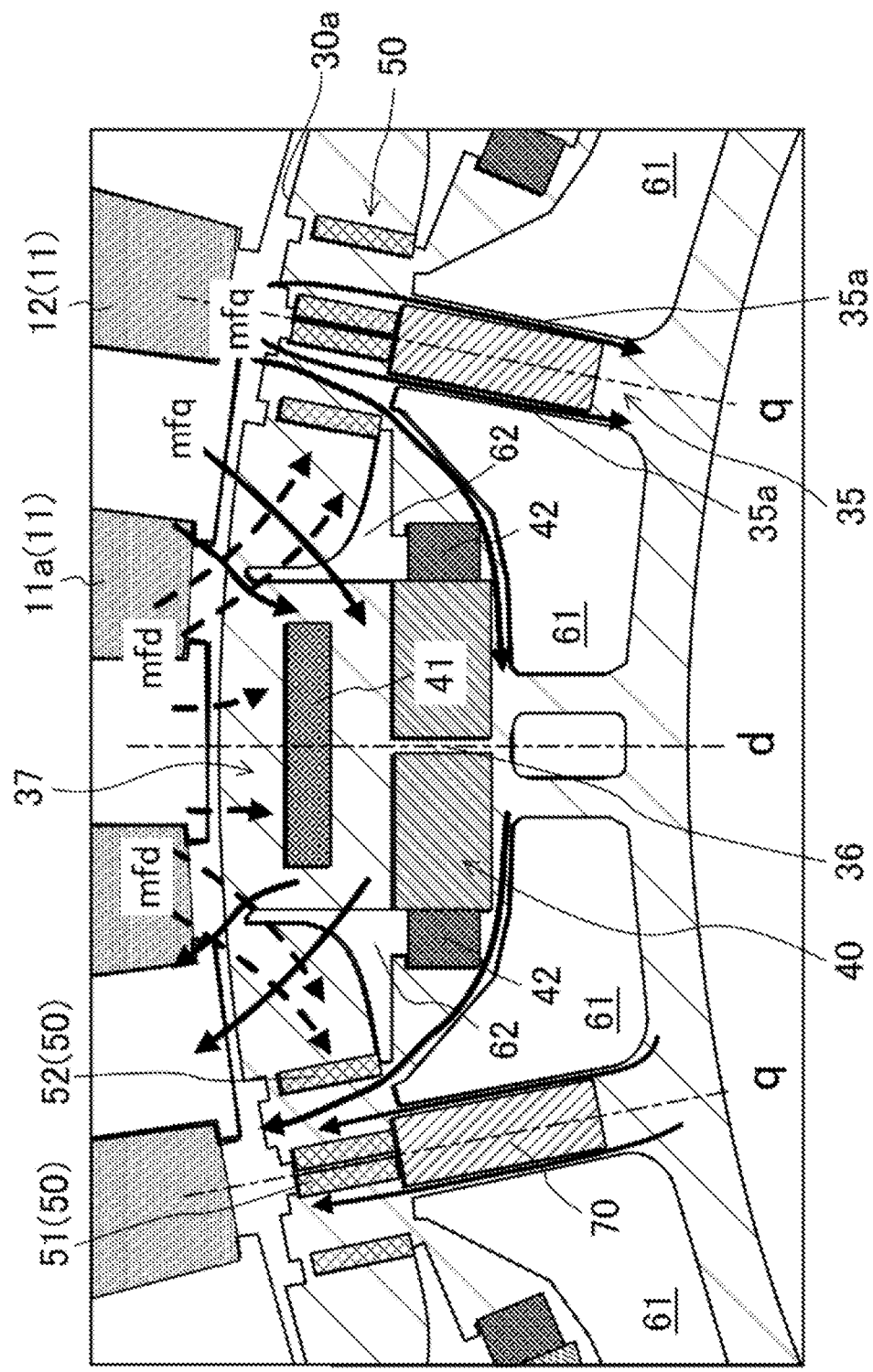
FIG. 10 is a view illustrating practical use of reluctance torque.

Referring to FIG. 10, practical use of the reluctance torque is described. FIG. 10 illustrates the magnetic pole part 33 in the rotor 30. A broken-line arrow mfd indicates a flow of d-axis magnetic flux (described later). A solid-line arrow mfq indicates a flow of q-axis magnetic flux (described later).

As described above, the reluctance torque increases as Lq becomes larger (i.e., a flow of the magnetic flux which flows from the stator 10 side to the rotor 30 centering on the q-axis (q-axis magnetic flux) becomes easier). The reluctance torque increases as Ld becomes smaller (i.e., a flow of the magnetic flux which flows from the stator 10 side to the rotor 30 centering on the d-axis (d-axis magnetic flux) becomes difficult).

In this regard, in the center part of the d-axis in the rotor 30, the first closed area 37 where both sides in the circumferential direction are defined by the second cavity part 62 and the inside in the radial direction is defined by the fixed magnetic-force magnet 40 is provided. Therefore, the d-axis magnetic flux which flows near the d-axis from the stator 10 side flows into the first closed area 37, and thus, it flows with difficulty.

In addition, the first auxiliary fixed magnetic-force magnet 41 is disposed on the radially outward part of the first closed area 37 so that it directly opposes to in the flow direction of the d-axis magnetic flux. Therefore, it flows with more difficulty. The inside coupling part 36 which is a part of the rotor core 32 exists in the center part of the circumferential width of the fixed magnetic-force magnet 40. However, since the first auxiliary fixed magnetic-force magnet 41 exists upstream thereof, the d-axis magnetic flux must bypass the first auxiliary fixed magnetic-force magnet 41 in order to flow into the inside coupling part 36. Therefore, it is difficult for the d-axis magnetic flux which flows near the d-axis to flow through the rotor 30.

Since the second cavity part 62 is tapered radially outward, the magnetic reluctance becomes smaller as it goes radially outward. Therefore, even inside the second cavity part 62, the magnetic flux flows comparatively easily through the radially outward part thereof. Therefore, the d-axis magnetic flux which flows near the d-axis may flow through the radially outward part of the second cavity part 62.

Further, the part of the rotor core 32 exists between the radially outward end part of the second cavity part 62 and the opposing surface 30a of the flange part 32a. Therefore, the d-axis magnetic flux which flows near the d-axis passes through this part. However, the flow of the d-axis magnetic flux goes in the direction in which the circumferential width of the second cavity part 62 increases, and the second variable magnetic-force magnet 52 in which the radially inward end part extends from the tip-end part of the circumferentially extending part 62b toward the opposing surface 30a is located downstream to which the d-axis magnetic flux flows.

Therefore, since the downstream magnetic path is also intercepted, the d-axis magnetic flux also flows with difficulty. Since the first variable magnetic-force magnet 51, the first cavity part 61, and the synthetic resin 70 exist further downstream thereof, even if the d-axis magnetic flux flows therein, it is more difficult to flow therethrough. As a result, it is difficult for the d-axis magnetic flux to flow through the rotor 30.

On the other hand, although the first variable magnetic-force magnet 51 exists in the center part of the q-axis in the rotor 30, its circumferential width is small. Further, since the second variable magnetic-force magnets 52 which are adjacent to both sides of the first variable magnetic-force magnet 51 are at the positions distant from the first variable magnetic-force magnet 51, the magnetic paths each of which is comprised of the rotor core 32 exist on both sides of the first variable magnetic-force magnet 51. Therefore, the q-axis magnetic flux which flows near the q-axis flows easily into the rotor 30.

Downstream of the flow of the q-axis magnetic flux which flowed into the rotor 30 from this part, the second pillar part 35 including the first cavity part 61 and the synthetic resin 70 exists. However, the pair of coupling arm parts 35a each of which is a part of the rotor core 32 are provided to the second pillar part 35. Further, radially outward of the first cavity part 61, the part with the bar shape in the axial cross-section exists along the curved surface 61a, as a part of the rotor core 32. Therefore, since the q-axis magnetic flux which flows near the q-axis can pass through these magnetic paths, it flows easily through the rotor 30.

Further, the q-axis magnetic flux which flows near the q-axis also flows easily through the rotor 30. That is, the second cavity part 62 exists downstream of the q-axis magnetic flux which flows into the d-axis side of the second variable magnetic-force magnet 52. However, since the second cavity part 62 is tapered radially outward, the magnetic reluctance decreases as it goes radially outward.

Thus, even in the second cavity part 62, the magnetic flux may flow through the radially outward part thereof. Therefore, the q-axis magnetic flux which flows near the q-axis may flow through the radially outward part of the second cavity part 62. Further, the part of the rotor core 32 exists between the radially outward end part of the second cavity part 62 and the opposing surface 30a of the flange part 32a. Therefore, the q-axis magnetic flux which flows near the q-axis magnetic flux may flow through this part.

Further, the flow of the q-axis magnetic flux goes in the direction in which the circumferential width of the second cavity part 62 does not increase, and downstream thereof to which the flow of the q-axis magnetic flux goes, the magnetic path comprised of the rotor core 32 which passes through the part between the fixed magnetic-force magnet 40 and the first auxiliary fixed magnetic-force magnet 41 exists, unlike with the flow of the d-axis magnetic flux. Thus, the q-axis magnetic flux can flow by the comparatively short distance in its flow direction. Therefore, the q-axis magnetic flux which flows near the q-axis also flows easily through the rotor 30. As a result, the q-axis magnetic flux flows easily through the rotor 30.

Thus, according to this structure of the rotor 30, the d-axis magnetic flux flows with difficulty, but the q-axis magnetic flux flows easily. Since the salient pole difference is large, the large reluctance torque can be achieved. Therefore, as well as the magnet torque, the reluctance torque can also be utilized effectively. As a result, since the maximum torque outputtable from the drive motor 2 also becomes large, the drive motor 2 can operate appropriately also in the high-torque operation scene.

Note that the disclosed art is not limited to the above embodiment, but it also includes various other configurations. For example, although in the above embodiment the hybrid vehicle is illustrated, it may be an electric vehicle which travels or is propelled only by the drive motor 2. Although the rotor core 32 is fixed to the shaft 20 via the hub 21, it may be fixed to the shaft 20 directly without the hub 21.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile
2 Drive Motor
3 Engine
6 Inverter
7 Drive Battery
10 Stator
11 Stator Core
12 Coil
30 Rotor
30a Outer Circumferential Surface (Opposing Surface)
31 Gap
32 Rotor Core
33 Magnetic Pole Part
34 First Pillar Part
35 Second Pillar Part
40 Fixed Magnetic-force Magnet
41 First Auxiliary Fixed Magnetic-force Magnet (Auxiliary Fixed Magnetic-force Magnet)
42 Second Auxiliary Fixed Magnetic-force Magnet
50 Variable Magnetic-force Magnet
51 First Variable Magnetic-force Magnet
52 Second Variable Magnetic-force Magnet
61 First Cavity Part
62 Second Cavity Part
63 Third Cavity Part
70 Synthetic Resin
PF Magnetic Pole Surface
J Rotation Axis

What is claimed is:

1. A structure of a rotor that constitutes a drive motor and has a changeable magnetic force, the structure comprising:
   a rotor core opposing a stator via a gap; and
   a plurality of magnetic pole parts disposed in the rotor core so that N-poles and S-poles are lined up alternately in a circumferential direction of the rotor core along an opposing surface, each of the magnetic pole parts including:
      a fixed magnetic-force magnet disposed in the rotor core so that a magnetic force thereof is oriented in a radial direction of the rotor core; and
      a variable magnetic-force magnet disposed so that a magnetic force thereof is oriented in the circumferential direction, the variable magnetic-force magnet being disposed in a part of the rotor core on an opposing surface side of the fixed magnetic-force magnet, at a position adjacent in the circumferential direction to the fixed magnetic-force magnet,
   wherein a cavity part is disposed in a part of the rotor core between the fixed magnetic-force magnet and the variable magnetic-force magnet when seen in an axial direction of the rotor core, the cavity part having an axial cross-section extending from an end part of the fixed magnetic-force magnet toward the opposing surface, and
   wherein the cavity part is formed so that a distance between the variable magnetic-force magnet and the cavity part in the circumferential direction becomes larger as the cavity part approaches the opposing surface, and a width of the cavity part in the circumferential direction becomes smaller as the cavity part separates from the fixed magnetic-force magnet in the radial direction.

2. The structure of claim 1, wherein the cavity part includes:
   a radially extending part tapered from an end part of the fixed magnetic-force magnet toward the opposing surface; and
   a circumferentially extending part tapered from a base end part of the radially extending part toward the variable magnetic-force magnet, and
   wherein the variable magnetic-force magnet includes:
      a first variable magnetic-force magnet separated from the cavity part; and
      a second variable magnetic-force magnet disposed so as to extend from a tip-end part of the circumferentially extending part toward the opposing surface in a state where the second variable magnetic-force magnet is adjacent to the first variable magnetic-force magnet.

3. The structure of claim 1, wherein the cavity part is disposed in a part of a flange part between the fixed magnetic-force magnet and the variable magnetic-force magnet, when seen in the axial direction.

4. The structure of claim 1, wherein the axial cross-section of the cavity part is formed so as to extend toward the opposing surface of the flange part that opposes to the stator and is annular in the axial cross-section from an end part of the fixed magnetic-force magnet, at a corner part located radially outward of the fixed magnetic-force magnet.

5. The structure of claim 1, wherein an auxiliary fixed magnetic-force magnet is disposed in a part of the rotor core between the fixed magnetic-force magnet and the opposing surface in a state where an end part thereof is located adjacent to the cavity part, the auxiliary fixed magnetic-force magnet being configured to reinforce the magnetic force of the fixed magnetic-force magnet.

6. The structure of claim 5, wherein the cavity part includes:
   a radially extending part tapered from an end part of the fixed magnetic-force magnet toward the opposing surface; and
   a circumferentially extending part tapered from a base end part of the radially extending part toward the variable magnetic-force magnet, and
   wherein the variable magnetic-force magnet includes:
      a first variable magnetic-force magnet separated from the cavity part; and
      a second variable magnetic-force magnet disposed so as to extend from a tip-end part of the circumferentially extending part toward the opposing surface in a state where the second variable magnetic-force magnet is adjacent to the first variable magnetic-force magnet.

7. The structure of claim 1, wherein the cavity part has a part tapered toward the opposing surface from an end part of the fixed magnetic-force magnet, and a part tapered toward the variable magnetic-force magnet from a base-end part of the radially extending part, and the cavity part is formed in an L-shape in the axial cross-section.

8. The structure of claim 7, wherein a side surface of the radially extending part on a d-axis side when seen in the axial direction extends linearly in the radial direction, a radially-inward side surface of the circumferentially extending part is extends linearly in the circumferential direction, and a side surface covering the q-axis side of the radially extending part and radially outward of the circumferentially extending part is curved bulging toward an end part of the fixed magnetic-force magnet.

\* \* \* \* \*